United States Patent [19]
Jacobs

[11] Patent Number: 6,009,437
[45] Date of Patent: Dec. 28, 1999

[54] LINEAR FITTING WITH MISSING DATA: APPLICATIONS TO STRUCTURE-FROM-MOTION AND TO CHARACTERIZING INTENSITY IMAGES

[75] Inventor: David W. Jacobs, Princeton, N.J.

[73] Assignee: NEC Research Institute, Inc., Princeton, N.J.

[21] Appl. No.: 09/003,484

[22] Filed: Jan. 6, 1998

Related U.S. Application Data

[60] Provisional application No. 60/041,695, Mar. 25, 1997, and provisional application No. 60/043,540, Apr. 14, 1997.

[51] Int. Cl.$^6$ ........................................................ G06K 9/32
[52] U.S. Cl. .......................... 707/102; 345/433; 382/300
[58] Field of Search .................................. 707/102, 104; 345/473, 433, 419; 382/236, 300, 238, 239; 348/575, 576

[56] References Cited

U.S. PATENT DOCUMENTS

| | | | |
|---|---|---|---|
| 5,535,288 | 7/1996 | Chen et al. | 382/236 |
| 5,625,715 | 4/1997 | Trew et al. | 382/236 |
| 5,778,101 | 7/1998 | Hwang | 382/250 |

OTHER PUBLICATIONS

David Jacobs, Linear Fitting with Missing Data: Applications to Structure–from–Motion and to Characterizing Intensity Images, Jun. 1997, IEEE.

A. Shashua (1992) "Photometric Alignment" *Geometry and Photometry in 3D Visual Recognition* Ph.D. Dissertation Massachuetts Institute of Technology: 79–90.

C. Tomasi et al. (1992) "Shape and Motion From Image Streams Under Orthography" A Factorization Method *International Journal of Computer Vision 9* (2): 137–154.

P.N. Belhumeur et al. (1996) "What is the Set of Images of an Object Under All Possible Lighting Conditions?" IEEE Conf. of Comp. Vis. and Pat. Rec.: 270–277.

S. Ullman et al. (1991) "Recognition by Linear Combinations of Models" *IEEE Transactions on Pattern Analysis and Machine Intelligence 13* (*10*): 992–1006.

R. Basri et al. (1993) "The Alignment of Objects With Smooth Surfaces" *CVGIP Image Understanding 57* (*3*): 331–345.

R. Basri (1996) "Paraperspective Affine" *International Journal of Computer Vision 19* (2): 169–179.

H.S. Sawhney et al. (1990) "Description and Reconstruction From Image Trajectories of Rotational Motion" *IEEE*: 494–498.

H. Shum et al. (1994) "Principal Component Analysis With Missing Data and its Application to Object Modeling" *IEEE*: 560–565.

T. Wiberg (1976) "Computation of Principal Components When Data Are Missing" Proc. Second Symp. Computational Statistics: 229–236.

*Primary Examiner*—Thomas G. Black
*Assistant Examiner*—Uyen Le
*Attorney, Agent, or Firm*—Scully, Scott, Murphy & Presser

[57] ABSTRACT

A method for generating a complete scene structure from a video sequence that provides incomplete data. The method has a first step of building a first matrix consisting of point locations from a motion sequence by acquiring a sequence of images of a fixed scene using a moving camera; identifying and tracking point features through the sequence; and using the coordinates of the features to build the first matrix with some missing elements where some features are not present in some images. In a second step an approximate solution is built by selecting triples of columns from the first matrix; forming their nullspaces into a second matrix; and taking the three smallest components of the second matrix. In a third step, an iterative algorithm is applied to the three smallest components to build a third matrix and to improve the estimate. Lastly, in a fourth step the third matrix is decomposed to determine the complete scene structure. Another aspect of the present invention are apparatus' for generating a complete scene structure from a video sequence that provides incomplete data utilizing the methods of the of the present invention.

16 Claims, 8 Drawing Sheets

LINEAR FITTING WITH MISSING DATA: APPLICATIONS TO STRUCTURE-FROM-MOTION AND TO CHARACTERIZING INTENSITY IMAGES

CROSS-REFERENCE TO RELATED APPLICATIONS

This is a conversion of provisional application Ser. No. 60/041,695, filed Mar. 25, 1997, and provisional application Ser. No. 60/043,540, filed Apr. 14, 1997.

BACKGROUND OF THE INVENTION

1. Field of the Invention

This invention relates generally to a method and apparatus for linear fitting with missing data: applications to structure-from-motion and to characterize intensity images.

2. Discussion of the Prior Art

Several vision problems can be reduced to the problem of fitting a linear surface of low dimension to data. For example, C. Tomasi et al. (1992) "Shape and Motion From Image Streams Under Orthography: A Factorization Method" *Int. J. of Comp. Vis.* 9(2): 137–154 show how to determine the structure and motion of a set of 3-D points tracked in a sequence of 2-D images by fitting a rank three matrix to a data matrix constructed from the noisy images, assuming an affine imaging model. P. Belhumeur et al. (1996) "What is the Set of Images of an Object Under All Possible Lighting Conditions?" *IEEE Conf. of Comp. Vis. and Pat. Rec.*: 270–277 show how to characterize the set of intensity images produced by a convex, Lambertian object, also by fitting a rank three matrix to a matrix constructed from noisy data. One serious issue for solutions based on this work is how to deal with a data matrix with some missing elements. In structure from motion, missing elements will occur in the data matrix if some point features are not visible in the image throughout the motion sequence, an almost inevitable occurrence. To construct the intensity manifold as suggested by P. Belhumeur et al. (1996), missing matrix elements will to arise when the surface normals of some scene points do not face the light source in some images; this must happen for any scene containing smooth objects, and will probably happen in most real scenes.

Recently, several important vision problems have been addressed by using affine imaging models, which reduce the problems to ones of finding a low-dimensional linear or affine surface that represents some important scene structure. For example, in the linear combinations work of S. Ullman et al. (1991) "Recognition by Linear Combinations of Models" *IEEE Trans. PAMI* 13(10): 992–1007 and R. Basri et al. (1988) "The Alignment of Objects With Smooth Surfaces" *Computer Graphics, Vision and Image Processing: Image Understanding* 57(3): 331–345, the set of images produced by any 3-D structure from different viewpoints is represented as a low-dimensional affine surface in the space of all possible images. This structure is then used for object recognition. C. Tomasi et al. (1992) use a related insight to efficiently perform structure-from-motion in long motion sequences. Since the noise-free images should all lie in a low-dimensional linear surface, such a surface can be fit to the data and then used to derive structure and motion. Y. Moses (1993) Face recognition: generalization to novel images Ph.D. Thesis, Weizmann Institute of Science and A. Shashua (1992) *Geometry and Photometry in 3D Visual Recognition* MIT TR-1401 show that the set of intensity images produced by a 3-D Lambertian structure from a single viewpoint, but with a point light source of varying position and intensity can also be described as a 3-D linear surface in a space of possible images. These form a 3-D linear surface in a space of possible images (the intensity manifold). P. Belhumeur et al. (1996) use this result to describe the set of intensity images produced by a convex object, allowing for multiple light sources and self-shadowing. In all of this work, the problem is greatly simplified by finding a reasonable set of assumptions to make it linear.

All of these methods require fitting a matrix of low rank r to a data set. The linear space spanned by this matrix corresponds to scene structure. In several approaches, this is done by acquiring only the minimal amount of data needed to construct an rxn matrix [see, S. Ullman et al. (1991), Y. Moses (1993), A. Shashua (1992) and P. Belhumeur et al. (1996)], which has exactly rank r even in the presence of noise. This method is simple, but can be quite sensitive to noise. S. Ullman et al. (1991) also propose using singular value decomposition (SVD) to fit a low rank matrix to a larger matrix built when extra images are used to over determine the problem. C. Tomasi et al. (1992) use a long motion sequence to build a large matrix, and then find the nearest low rank matrix using SVD. This method finds the low rank matrix that minimizes the sum of square differences between each element in the new matrix and the data matrix. By over determining the problem and finding a least squares fit to the data, this method can reduce the effects of noise.

A significant limitation of these methods is that they require a data matrix with no missing elements. In the case of structure-from-motion, this means that every point feature must be visible in every image. This is a strong assumption because often points enter or leave the field of view during a motion sequence, or may be blocked from view by other objects in the middle of a sequence. The methods that derive the intensity manifold produced by a scene use a set of images in which illumination in each image comes from a single point light source. The data matrix will have missing elements when scene points are not illuminated by the light source; therefore, these methods require that every visible scene point be illuminated in every image. However, for scenes with smooth objects, this assumption will be met only when the light source direction is the same as the viewing direction, i.e., for one possible image. More generally, most visible points will be illuminated only when the light source is near the viewing direction. However, if images are generated with similar light source directions, the resulting solution may be unstable.

C. Tomasi et al. (1992) describe a simple heuristic method for fitting a matrix that has missing elements. H. Shum et al. (1995) "Principal Component Analysis With Missing Data and Its Applications to Polyhedral Object Modeling" *IEEE Trans. PAMI* 17(9): 854–867 apply an iterative method due to T. Wiberg (1976) "Computation of Principal Components When Data Are Missing" *Proc. Second Symp. Computational Statistics:* 229–236 to a related structure from motion problem. This method minimizes the sum of square differences between the fitted, low rank matrix and the elements that are not missing in the data matrix. This approach has the virtue of converging to a locally optimal solution, however, it is not guaranteed to find the globally optimal one. While this iterative method has its advantages, it can often converge to the wrong answer if it does not have a good starting point.

The methods proposed by S. Ullman et al. (1991) and C. Tomasi et al. (1992) assume that a sequence of matched image points is given, and that these were projected from 3-D to 2-D using a camera model that is affine, or a subset of affine (e.g., orthographic, weak perspective or paraperspective, as set forth in R. Basri (1996) "Paraperspective≡Affine" *Int. J. of Comp. Vis.* 19(2): 169–179). The translation component of motion is estimated separately, by estimating the translation of the center of mass of the points we therefore assume for simplicity that there is no in-plane translation. Let $p_i=(x_i, y_i, z_i)^T$ be the i'th 3-D point feature. Then the model to image transformation may be written as a 2×3 matrix $S_i$. Letting $q_i=(X_i, Y_i)$ stand for the image point produced by $p_i$, this gives:

$$\begin{pmatrix} X_i \\ Y_i \end{pmatrix} = \begin{pmatrix} s_{11} & s_{12} & s_{13} \\ s_{21} & s_{22} & s_{23} \end{pmatrix} \begin{pmatrix} x_i \\ y_i \\ z_i \end{pmatrix}$$

For the case of scaled-orthographic projection, $S_i$ is the first two rows of a scaled rotation matrix.

We can now represent an entire image sequence in simple matrix notation. Let P be a matrix whose i'th column is $p_i$:

$$P \equiv \begin{pmatrix} x_1 & x_2 & \ldots & x_n \\ y_1 & y_2 & \ldots & y_n \\ z_1 & z_2 & \ldots & z_n \end{pmatrix}$$

Let T stand for a matrix containing all rows of all transformations $S_i$, that is, row $2i-1$ of T is the first row of $S_i$, and row $2i$ of T is its second row.

$$T \equiv \begin{pmatrix} S_1 \\ S_2 \\ \vdots \\ S_{\frac{m}{2}} \end{pmatrix}$$

Finally, let $\hat{Q}$ stand for a single matrix containing all tracked image points. Each column of $\hat{Q}$ contains all the image coordinates of a single point. That is $\hat{Q}_{2i-1,j}$ gives the x coordinate of $q_j$ in image i, and $\hat{Q}_{2i,j}$ gives the y coordinate of $q_j$, in image i. We write:

$$\hat{Q} \equiv \begin{pmatrix} \hat{X}_{1,1} & \hat{X}_{1,2} & \ldots & \hat{X}_{1,n} \\ \hat{Y}_{1,1} & \hat{Y}_{1,2} & \ldots & \hat{Y}_{1,n} \\ \hat{X}_{2,1} & \hat{X}_{2,2} & \ldots & \hat{X}_{2,n} \\ \hat{Y}_{2,1} & \hat{Y}_{2,2} & \ldots & \hat{Y}_{2,n} \\ \vdots & \vdots & \vdots & \vdots \\ \hat{X}_{m/2,1} & \hat{X}_{m/2,2} & \ldots & \hat{X}_{m/2,n} \\ \hat{Y}_{m/2,1} & \hat{Y}_{m/2,2} & \ldots & \hat{Y}_{m/2,n} \end{pmatrix}$$

where $(\hat{X}_{i,j})$ is the X coordinate of the j'th noisy image point in the i'th image, and $\hat{Y}_{i,j}$ is similarly defined. Let E be a matrix of the same dimension as $\hat{Q}$, whose elements indicate the noise encountered in sensing the corresponding elements of $\hat{Q}$. Then we may simply describe the generation of the whole image sequence as:

$$TP+E=\hat{Q}$$

We further define:

$$Q=\hat{Q}-E=TP$$

Although we have no direct access to the error-free data Q, we wish to estimate it from $\hat{Q}$. Because T has three columns, it can only have rank three, and consequently, Q can have only rank three. (That is, the columns, or rows, of Q, regarded as points, must occupy no more than a 3-D linear subspace of $R^m$ ($R^n$). Any column, or row, will be a linear combination of any other three linearly independent columns, or rows.)

The matrix containing the coordinates of sensed image points $\hat{Q}$ will be a noisy version of Q, and will have full rank. However, if we find the Q matrix of rank three that is closest to $\hat{Q}$, we can obtain a maximum likelihood estimate of Q. In particular, we can use SVD to find the Q matrix that minimizes $\Sigma_i \Sigma_j (\hat{Q}_{ij}-Q_{ij})^2$. We can also use SVD to factor this Q matrix into T and P, providing us with estimates of the structure and motion of the 3-D points, up to an affine transformation. See C. Tomasi et al. (1992) for further details.

When some points are not visible in some images, $\hat{Q}$ will contain missing entries for these points. We still know that the error free data, were it all visible, would give rise to a Q matrix of rank three (we can still remove the effects of translation between adjacent images from our data by computing the translation of the center of mass of those points present in adjacent images. For this we need only assume that some points will always be present from one image to the next). We can, therefore, find the affine structure and motion that minimizes error by finding the Q matrix that is closest to $\hat{Q}$ where we now compare only those elements actually present in $\hat{Q}$ to the corresponding elements of $\hat{Q}$. The problem of finding structure from motion in the presence of missing data, then, depends on finding the nearest rank three matrix to a data matrix with missing elements.

A similar formulation has been used by A. Shashua (1992), Y. Moses (1993) and P. Belhumeur et al. (1996) to describe the set of intensity images produced by a 3-D Lambertian structure exposed to a point light source at infinity. Let the direction of the source scaled by its intensity be the 3-D vector: −h. In this case, let $q_j$ be the intensity of image pixel j. Finally, assume that this intensity is produced by a 3-D planar patch of the scene with a surface normal $n_j$, and albedo $p_j$. Then, intensities are produced according to the equation:

$$q_j = h \cdot p_j n_j$$

provided that this produces a positive value (i.e., each surface normal is facing the light source). Since we can never recover the absolute magnitude of h or $p_j$ from a set of the equations, we may without loss of generality assume that $p_j n_j$ is simply an unconstrained 3-D vector (that is, the constraint that albedo is less than one has no effect without some limitation on the scale of h). Next, assume we take a set of images in which the viewpoint is fixed, but the lighting intensity and direction may vary. Let N be a scene matrix in which the j'th column is $p_j n_j$. Let H be a lighting matrix in which the i'th row is the h vector for the i'th image. And let $\hat{Q}$ be a data matrix in which the j'th column gives the intensity of the j'th pixel in every image. Then we have:

$$\hat{Q}=HN+E$$

$$Q=\hat{Q}-E=HN$$

where E is again a matrix of sensing errors. Again, Q has rank three. Again, our noisy images provide a full rank matrix $\hat{Q}$, and again, we can estimate Q, H and N from $\hat{Q}$ by using SVD to find the nearest rank three matrix to $\hat{Q}$, along with its decomposition. In previous work, A. Shashua (1992) and P. Belhumeur et al. (1996) have used the simpler, but less robust, method of using only three images to form $\hat{Q}$, in which case $\hat{Q}$ has only rank three, and is the best estimate of Q. A. Shashua (1992) uses the matrix N to determine whether a novel image could be generated by the same scene, by determining whether the novel image is a linear combination of the rows of N.

For this problem, $\hat{Q}$ will have missing elements when some of the scene surface normals do not face the light source. For if $h \cdot p_j n_j$ is negative, the scene point is self-shadowed, and we perceive zero intensity plus noise, not negative intensity. We can tell from the fact that a scene point is dark that it does not face the light source, but we have no further information about its orientation. P. Belhumeur et al. (1996) use N to determine the more complicated illumination cone that describes the set of images that a scene can produce allowing for this self-shadowing effect, but they must still build N using images in which there is no self-shadowing. However, if we have many images containing self-shadowing, we can construct a $\hat{Q}$ matrix with missing elements. Again, the key problem to estimating the quantities of interest will be to find the best rank three approximation to a matrix with missing elements.

C. Tomasi et al. (1992) propose one method for finding the best rank three approximation to a matrix with missing data. In their method, one first locates a rectangular subset of the matrix with no missing data. SVD is used to find the best rank three approximation to this submatrix. Then the missing elements of an additional column (or row) are filled in by finding the linear combination of a basis for the columns (or rows) of the submatrix that best fits the non-missing elements of the new column (or row). In this way, the solution is iteratively extended one column (or row) at a time. The resulting solution is then refined using a steepest descent minimization to find the rank three matrix that is nearest to all the data present in the $\hat{Q}$ matrix.

This solution seems like a reasonable heuristic because missing data is filled in using over constraining information, and C. Tomasi et al. (1992) demonstrate its effectiveness on two motion sequences. However, the proposed method for initially filling in the missing matrix elements has several potential disadvantages. First, the problem of finding the largest full submatrix of a matrix with missing elements is NP-hard (max-clique can be easily reduced to this problem) so heuristics must be used to find a starting point. Second, the data is not used symmetrically. A small subset of the data may be used to compute the first missing elements, which may lead to significant inaccuracies in these elements. It is not clear how these inaccuracies will propagate in the computation of additional missing elements. Third, for an m×n matrix, the method requires O(max(m,n)) applications of SVD. Finally, it is not certain that the final application of steepest descent will cause the method to converge to a globally optimal solution.

H. Shum et al. (1995) have also done recent work relevant to the missing data problem. They consider the problem of deriving structure and motion based on 3-D data whose significance can be weighted, leading to a weighted least squares problem of fitting a low rank matrix to a data matrix. For this problem, they suggest the use of an iterative method due to the findings set forth in T. Wiberg (1976); this iterative method clearly can also be applied to the missing data problem considered in this paper. This method appears likely to have better convergence properties than a steepest descent approach, and we use it in our experiments. This method is described in detail in H. Shum et al. (1995), however, for completeness, we will synopsize their description here, since we use their method in our experiments. We can briefly describe the method as formulating the least squares problem as a bilinear optimization, and then iteratively holding one set of variables constant while the others are optimized, so that each optimization is linear.

In more detail, suppose first that we wish to estimate Q=TP from a noisy $\hat{Q}$ matrix with no missing elements, where Q is an m×n matrix of rank r, meaning that T is m×r and P is r×n. We will recursively update estimates of T and P, letting $T_i$ and $P_i$ denote our i'th estimate of each value. We first fix $T_1$, using some initial estimate. Then, we wish to find $P_i$, such that $T_i P_i$ is nearest to $\hat{Q}$ in a least squares sense. This is just an over constrained linear estimation problem, which may be solved by taking:

$$P_i = T_i^+ \hat{Q}$$

where $T_i^+$ is the psuedoinverse of $T_i$. Next we can fix $P_i$ and compute $$T_{i+1} = \hat{Q} P_i^+$$

Clearly, this produces a series of estimates of Q, T and P in which the magnitude of $\hat{Q}-Q$ is non-increasing.

We can apply this same algorithm when $\hat{Q}$ has missing elements, after a slight modification. To do this, we can rewrite Q=TP as:

$$\begin{pmatrix} Q_{11} \\ Q_{21} \\ \vdots \\ Q_{m1} \\ Q_{12} \\ Q_{22} \\ \vdots \\ Q_{m2} \\ \vdots \\ Q_{mn} \end{pmatrix} = \begin{bmatrix} T & 0 & 0 & 0 & 0 & 0 \\ 0 & T & 0 & 0 & 0 & 0 \\ \vdots & \vdots & \vdots & \vdots & \vdots & \vdots \\ 0 & 0 & 0 & 0 & 0 & T \end{bmatrix} \begin{pmatrix} P_{11} \\ P_{21} \\ \vdots \\ P_{r1} \\ P_{12} \\ \vdots \\ P_{r2} \\ \vdots \\ P_{rn} \end{pmatrix}$$

where we have written Q and P as vectors, and written T as a big, block-diagonal matrix, with T repeated n times. Again, we can apply the same procedure, fixing T, and multiplying the pseudo inverse of the block-diagonal matrix of it by a vector constructed from $\hat{Q}$. This will give a new estimate of P. The second part of the iteration can be performed by simply writing T as a vector, and building a similar block-diagonal matrix of P.

We can now readily modify this procedure when $\hat{Q}$ has missing elements. We just delete all rows of the vectors and block-diagonal matrix corresponding to missing elements of $\hat{Q}$, and perform the procedure as before. Note that taking the pseudoinverse of the block-diagonal matrix is not too expensive, since the pseudoinverse of each block may be taken separately.

SUMMARY OF THE INVENTION

It is, therefore, an object of the invention to provide a novel method of fitting a low rank matrix to a matrix with missing elements based on a new insight into the geometric structure of the problem. Our method has several desirable properties. We can show that when no noise is present, our method will produce exactly the correct answer, or in degenerate cases, it will produce no answer. Also, it can make use of all the data, rather than relying on a subset of the matrix that is fully occupied. We show experimentally that our method produces good results in the presence of noise. These results can be either used directly, or can serve as an excellent starting point for an iterative method. At the same time, we show that without a good starting point, an iterative method can often get stuck in a local minimum.

Therefore, more reliable and general solutions can be obtained by fitting a low rank matrix to a data matrix that has some missing elements. This will allow the structure-from-motion algorithms to use tracked scene points that are not visible in some images, and will allow construction of the possible scene intensities from many images in which the scene is only partially illuminated.

We present a novel method of fitting a low rank matrix to a matrix with missing elements, and show how to apply it to both the structure-from-motion and intensity image description problems. Our method is based on a direct solution to the problem of minimizing a different, but closely related, functional.

This method has several desirable properties. First, we can show that when no noise is present, our method will produce exactly the correct answer, or in degenerate cases, it will produce no answer. That is, the error functional we minimize is also zero when the fitted matrix matches the data matrix perfectly in all non-missing elements. Second, our method is not iterative. Third, it can make use of all the data, rather than relying on a subset of the matrix that is fully occupied. We show experimentally that our method produces accurate results in the presence of noise. These results can be either used directly, or can serve as an excellent starting point for an iterative solution.

Accordingly, a new algorithm for fitting a low rank matrix to a matrix having missing data is provided. Instead of iteratively attempting to optimize the sum-of-squares difference between the matrices, we formulate a new cost function which we can optimize directly using standard tools of linear algebra, especially SVD. Through this new cost function is heuristic, we will show that it bears a close relationship to the sum-of-squares difference of the matrices. Our presentation has three parts. First, we describe the geometric intuitions behind the algorithm, considering only the error-free case. Then we describe the basic algorithm, which allows for sensing error. Finally, we discuss a number of heuristic modifications that make the algorithm more robust, along with suggestions for further future modifications.

Also provided is a method for generating a complete scene structure from a video sequence that provides incomplete data. The method comprises a first step of building a first matrix consisting of point locations from a motion sequence by acquiring a sequence of images of a fixed scene using a moving camera; identifying and tracking point features through the sequence and using the coordinates of the features to build the first matrix with some missing elements where some features are not present in some images. In a second step an approximate solution is built by selecting triples of columns from the first matrix; forming their nullspaces into a second matrix; and taking the three smallest components of the second matrix. In a third step, an iterative algorithm is applied to the three smallest components to build a third matrix and to improve the estimate. Lastly, in a fourth step the third matrix is decomposed to determine the complete scene structure.

In an alternative embodiment, a method for generating a complete scene structure from a video sequence that provides incomplete data is provided. The method comprises a first step of building a first matrix consisting of intensity values from multiple images by; acquiring a series of images of a fixed scene each with a different point light source; identifying points in each image that provide unreliable data due to shadowing or specularities; and building the first matrix of intensity values with missing elements where data is unreliable. In a second step an approximate solution is built by selecting triples of columns from the first matrix; forming their nullspaces into a second matrix; and taking the three smallest components of the second matrix. In a third step, an iterative algorithm is applied to the three smallest components to build a third matrix and to improve the estimate. Lastly, in a fourth step the third matrix is decomposed to determine the complete scene structure.

Another aspect of the present invention is an apparatus for generating a complete scene structure from a video sequence that provides incomplete data. The apparatus comprises a camera for acquiring a sequence of images of a fixed scene; means for identifying and tracking point features through the sequence; and computing means for building a first matrix consisting of point locations from a motion sequence; building the first matrix with some missing elements using the coordinates of the features where some features are not present in some images; building an approximate solution comprising; selecting triples of columns from the first matrix; forming their nullspaces into a second matrix; taking the three smallest components of the second matrix; applying an iterative algorithm to the three smallest components to build a third matrix and to improve the estimate; and decomposing the third matrix to determine the complete scene structure. In a preferred embodiment, the computing means is a personal computer.

In an alternative embodiment, an apparatus for generating a complete scene structure from a video sequence that provides incomplete data is provided. The apparatus comprises; a plurality of discrete point light sources for acquiring a series of images of a fixed scene; and computing means for building a first matrix consisting of intensity values from multiple images; identifying points in each image that provide unreliable data due to shadowing or specularities; building the first matrix of intensity values with missing elements where data is unreliable; building an approximate solution comprising; selecting triples of columns from the first matrix; forming their nullspaces into a second matrix; taking the three smallest components of the second matrix; applying an iterative algorithm to the three smallest components to build a third matrix and to improve the estimate; and decomposing the third matrix to determine the complete scene structure. In a preferred embodiment of the alternative apparatus, the computing means is a personal computer.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENTS OF THE INVENTION

Figure 1:
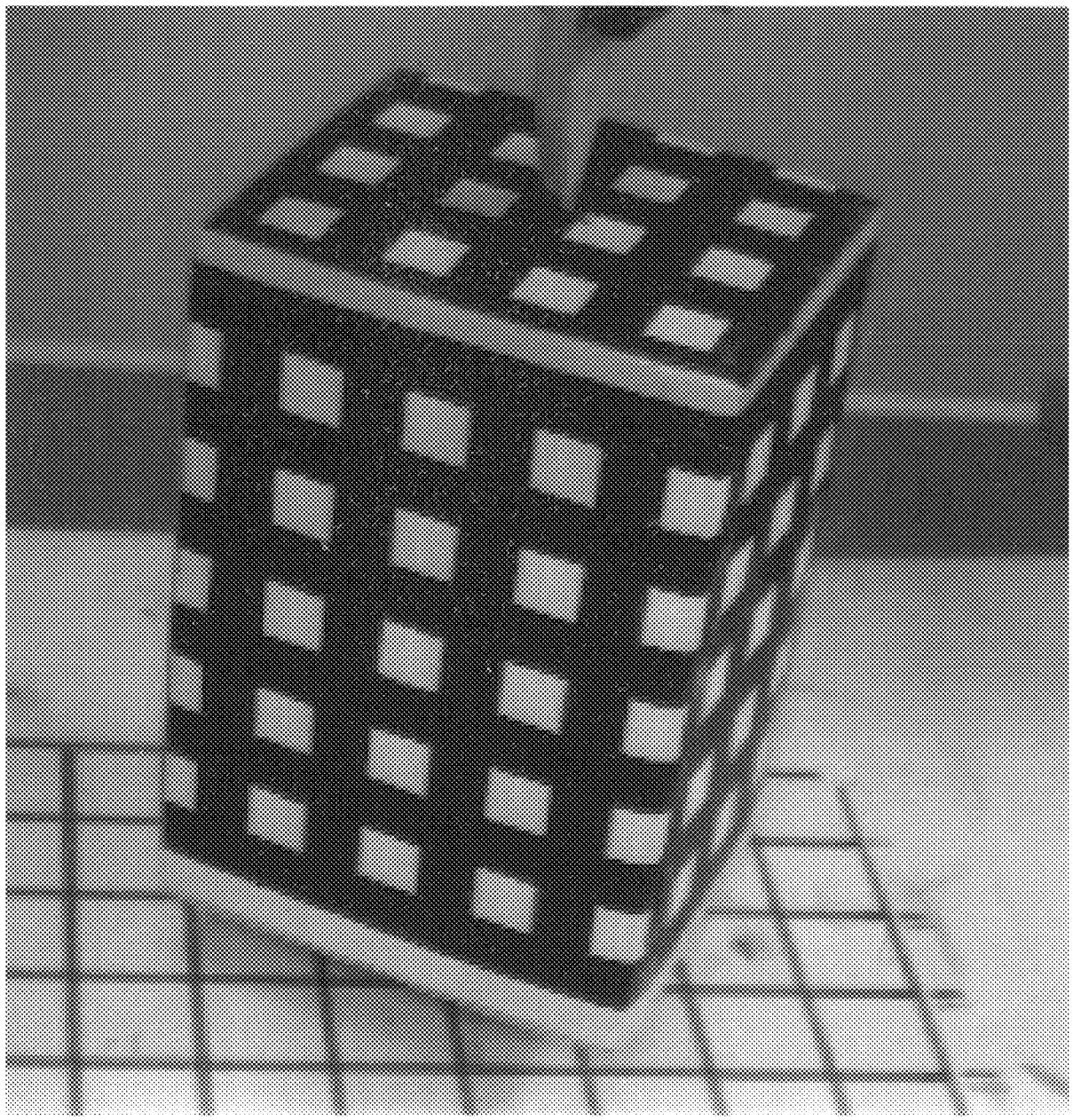
FIG. 1 depicts one frame of the real motion sequence used.
Figure 2:
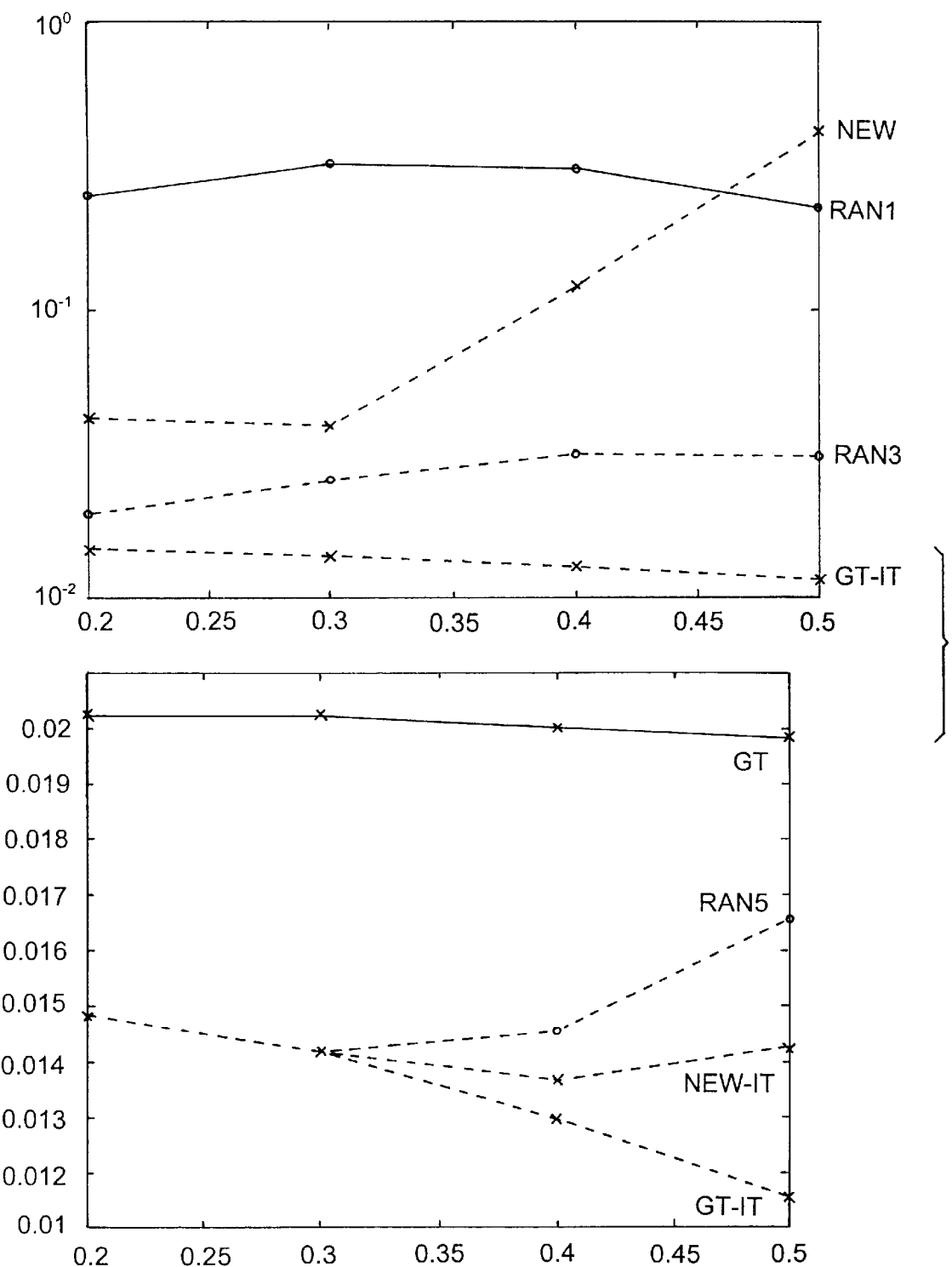
FIG. 2 depicts the average error of five solution methods, with two comparison solutions. Each point shows the sum of square errors between the data and a rank three fit, averaged over 100 trials. Average error is plotted against the average fraction of frames f in which a point is occluded. Error is divided by (1−f) to correct the sum of the error diminishing because less data is compared to the fit. The top plot log-scale plot shows four solutions. On the bottom, we plot on a linear scale methods that produce much less error. For comparison, we show GT-IT in both plots.
Figure 3:
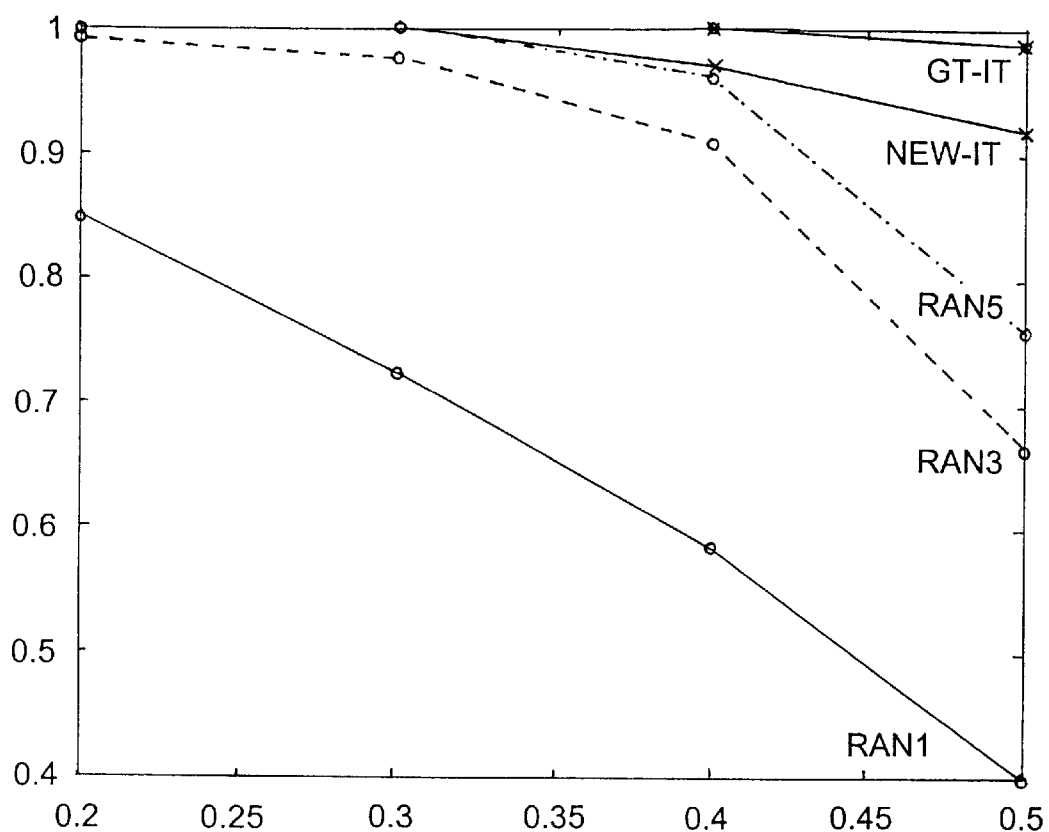
FIG. 3 depicts the fraction of times the iterative methods converged to the best available solution.
Figure 4:
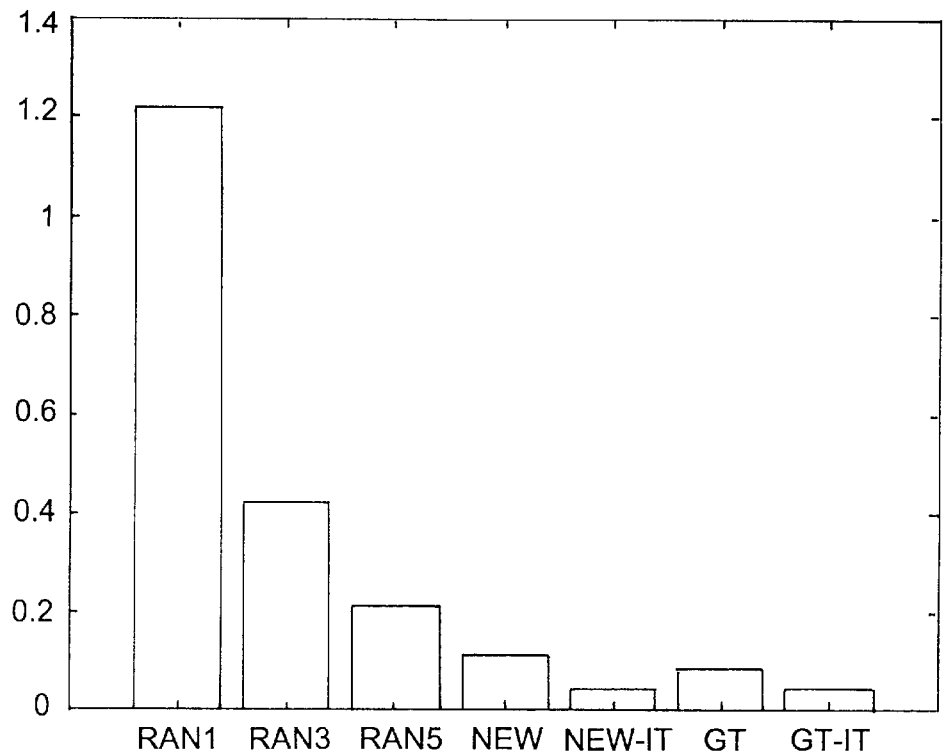
FIG. 4 depicts the average residual error produced in experiments fitting a rank three matrix to intensity images with missing data, averaged over 100 trials.
Figure 5:
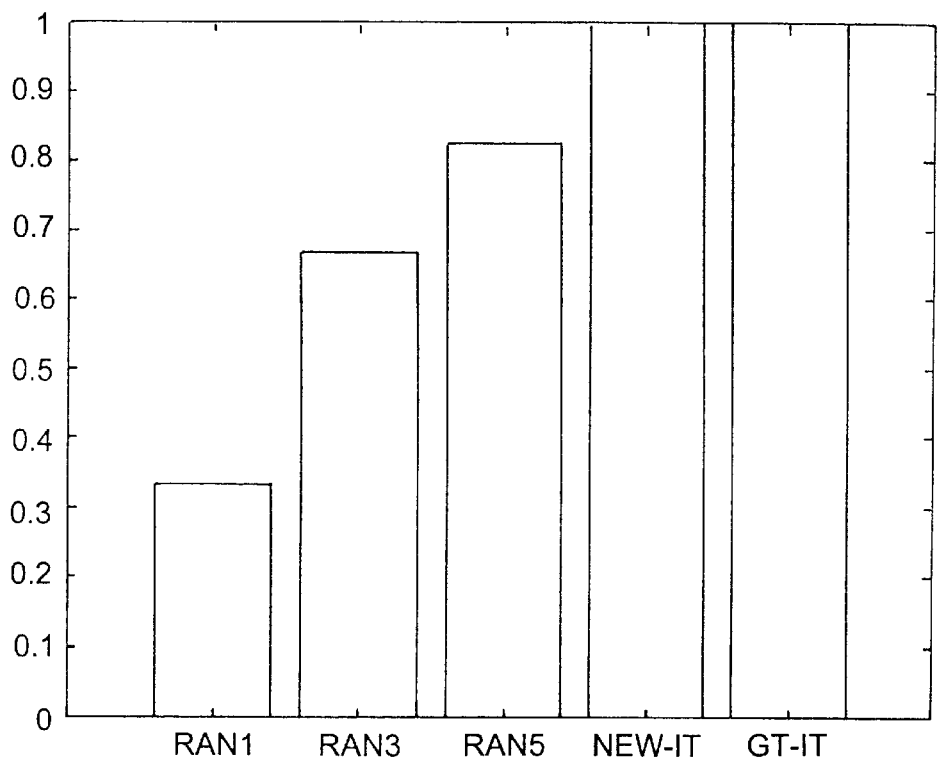
FIG. 5 depicts how often the iterative methods converge to the best available solution for intensity images.
Figure 6:
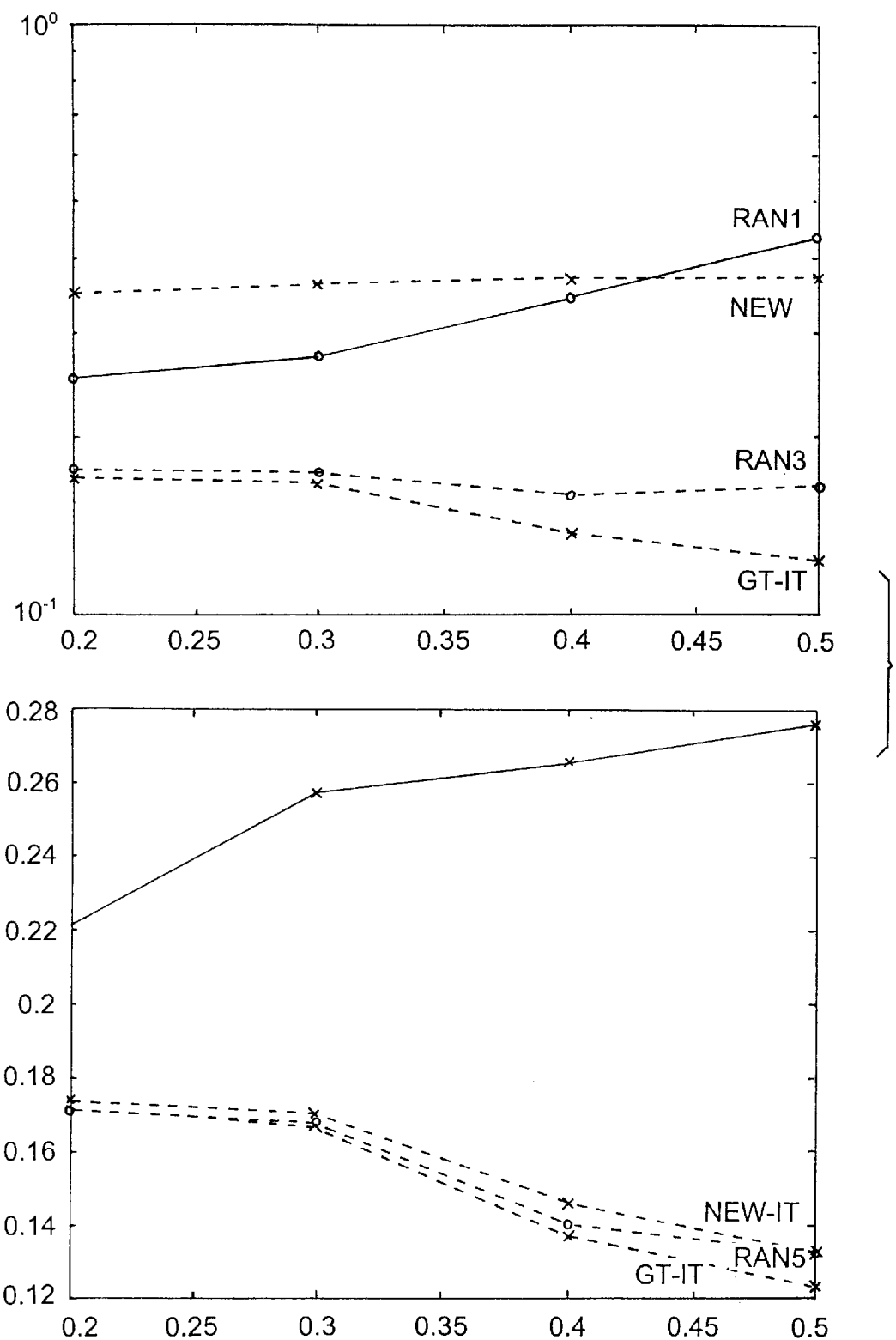
FIG. 6 depicts average errors for the real motion sequence displayed as in FIG. 2.
Figure 7:
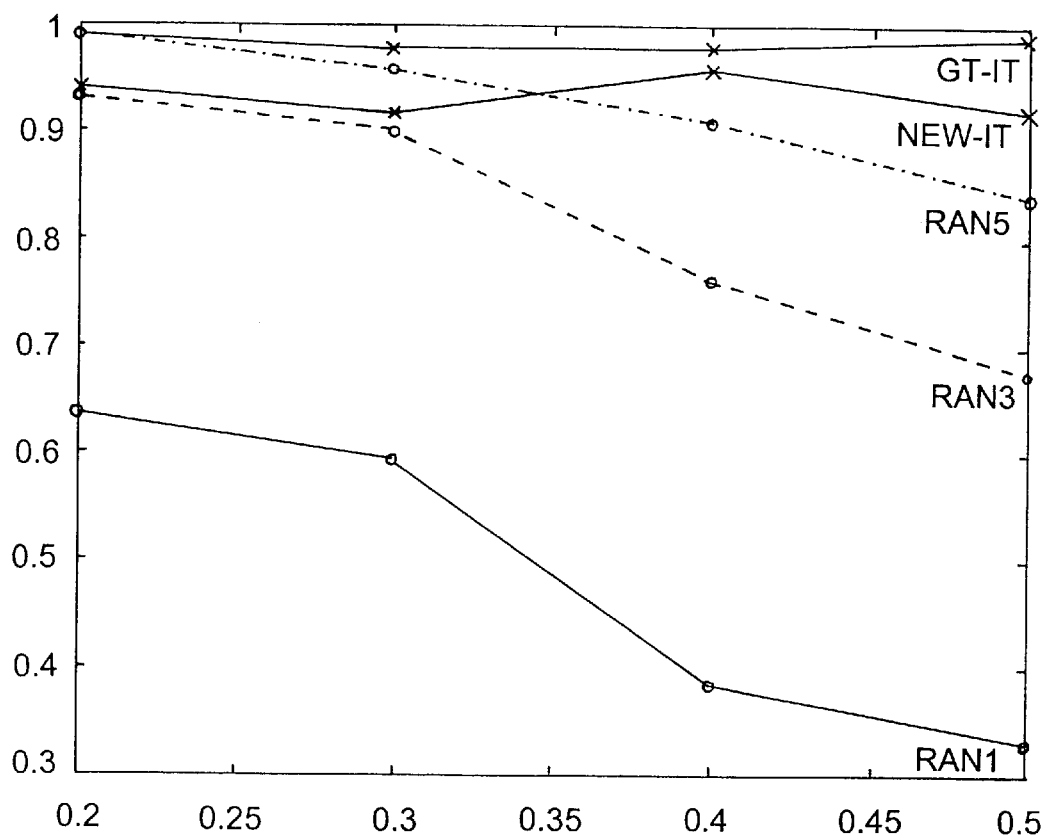
FIG. 7 depicts the fraction of times the iterative methods converged to the best available solution.

To gain a geometric intuition of our problem, it is helpful to regard each column of $\hat{Q}$, as giving the coordinates of a point in an m-dimensional space. In this view, using SVD the C. Tomasi et al. (1992) or the S. Ullman et al. (1991) algorithms find the 3-D linear subspace L that is "closest" to the n m-dimensional points in $\hat{Q}$, when this matrix contains no missing elements. L is closest to these points in that it minimizes the sum of square distances to them. At the same time, SVD constructs the columns of Q by finding each point in L that is closest to the corresponding point in $\hat{Q}$.

When $\hat{Q}$ has missing elements, we are free to fill in these elements to improve the fit between model and data. A column of $\hat{Q}$ with missing elements is a point with some coordinates unknown; that is, it is an affine subspace in an m-dimensional space (and is parallel to the axes of this space). Our problem in this case is to find the 3-D linear subspace L that is closest to these affine spaces, as measured by the sum of square distances between them. Q and the missing elements of $\hat{Q}$ can then be found by assigning each column of Q to be the point in L closest to the affine space represented by the corresponding column of $\hat{Q}$, and the missing elements of this column of Q can be filled by taking the point in this affine subspace closest to L.

We now show how to construct an appropriate algorithm for the case where there is no sensing error (e.g., $\hat{Q}$ is identical to Q except for its missing elements), and then describe how to modify this algorithm to allow for error. When there is no noise, L intersects all the affine spaces described by the columns of $\hat{Q}$. Let $A_1$, $A_2$, $A_3$ denote three of these affine subspaces that do not intersect. It should be noted that this assumption that the spaces do not intersect is not significant in practice. Since the affine spaces are parallel to the coordinate axes, two spaces intersect only when for every row they have either identical values, or one has a missing value. Such triples are easily discarded in the described algorithm. Since L contains a unique point other than the origin in common with each of these affine spaces, L must lie inside the space spanned by the points in these three spaces. Therefore, each triple of columns of $\hat{Q}$ constrains L to lie in some linear subspace of $R^m$. The significance of this constraint will depend on the number of missing elements in these columns. If the columns have no missing elements, they specify L exactly. Alternately, if the columns have many missing elements, the affine spaces they give rise to will be of high dimension and may span a very high dimensional space; in this case, the constraint that L lies in this space will be a weak one.

We can combine constraints derived from many different triples of columns of $\hat{Q}$ just by taking the intersection of the linear spaces to which they lead. Specifically, let T be some set of triples of affine spaces corresponding to columns of $\hat{Q}$, and let span $(A_1, A_2, A_3)$ denote the linear space spanned by the points in the affine spaces $A_1, A_2, A_3$. Then we have:

$$L \subseteq \bigcap_{(i,j,k)\in T} \text{span}(A_i, A_j, A_k) \qquad (2)$$

Note that we get a subset, not an equality relationship. This means that if $$\bigcap_{(i,j,k)\in T} \text{span}(A_i, A_j, A_k)$$

is three-dimensional, we know L exactly, but if this intersection is of higher dimension, we do not. Moreover, if we are unsure of the rank of Q, $\bigcap_{(i,j,k)\in T} \text{span}(A_i, A_j, A_k)$ gives us an upper bound on this rank. In practice, our simulations show that in the error free case, for reasonable amounts of missing data, we can uniquely and correctly determine Q after sampling only a small subset of the possible triples of columns of $\hat{Q}$.

In a practical algorithm, we must allow for the possibility of sensing error. With error, $\bigcap_{(i,j,k)\in T} \text{span}(A_i, A_j, A_k)$ quickly becomes empty because there is no linear subspace that can perfectly match our data by intersecting the affine spaces associated with each column. So in this case, we compute a linear subspace that comes as close as possible to lying in this intersection.

To begin we select 1 triples of columns of $\hat{Q}$. At present, we simply select these at random. Let $S_i$ denote the linear space spanned by the i'th triple of columns. A convenient way to take the intersection of these spaces is by taking the complement of the span of their complementary spaces. Let $N_i$ denote the nullspace of $S_i$. Then, we have L $\subseteq$ nullspace (span$_{i=1}^{1} N_i$), in the error free case. We may compute nullspace (span$_{i=1}^{1} N_i$) by taking the nullspace of the matrix:

$$N = [N_1 N_2 \ldots N_1]$$

In the presence of sensing error, the matrix N will typically have full rank, and its nullspace will be empty. In this case, we want to find the 3-D linear space that is close to being this nullspace, that is, the space that is most easily made into the nullspace by allowing for small amounts of noise. This is done by taking the SVD of N and finding its three least significant components. This gives us an estimate of L as the 3-D linear subspace most nearly orthogonal to the space spanned by N.

The three least significant components of the SVD of N provide a representation of L as three orthonormal column vectors that span L. We then use these to construct Q. For each column of $\hat{Q}$, we find the linear combination of the columns representing L that best fits the elements that are not missing. Specifically, assume L is represented by three orthonormal columns, let $\hat{Q}_i$ represent a column of $\hat{Q}$, let p be the indices of non-missing elements of $\hat{Q}_i$, and let $\hat{Q}_i^p$ be the column obtained by taking only the non-missing elements of $\hat{Q}_i$, and let $L^p$ similarly be the submatrix of L consisting of rows with indices in p. Then we estimate:

$$Q_i \approx L((L^p)^+ \hat{Q}_i^p)$$

where $(L^p)^+$ is the pseudoinverse of $L^p$.

We now mention several details that are important to the implementation of this algorithm. First, we describe how we compute the nullspace of the space spanned by three affine spaces. Let $C_i$, $C_j$, $C_k$ be three columns of $\hat{Q}$ that give rise to three affine spaces $A_i$, $A_j$, $A_k$. We note that if any row of $C_i$, $C_j$ or $C_k$ is missing an element, then that row will have a zero value for every element of the nullspace of span $(A_i, A_j, A_k)$. Therefore, to compute the nullspace, we need only find the nullspace of the submatrix of $[C_i C_j C_k]$ that is fully occupied, filling in the remaining rows of the nullspace with all zeros.

Second, it can happen that the nullspace of span $(A_i, A_j, A_k)$ is not an accurate constraint on L, due to numerical instability. As a simple example, suppose that $A_i, A_j, A_k$ are just three points that, along with the origin, nearly lie in some 2-D plane P. Then their span is 3-D, and in the absence of sensing error, would specify L exactly. However, in practice, any 3-D linear subspace that includes P will lie close to all three points; and when noise is added, their span will be a pretty arbitrary 3-D linear subspace that includes P. It would, therefore, be mistaken to expect L to lie in their span. This situation, however, is readily detected. We compute the nullspace by applying SVD to the submatrix of $[C_iC_jC_k]$ that is fully occupied. If this submatrix is not, or nearly not, of full rank, we know that the constraints derived from it are unreliable.

Third, although we set a threshold l on the number of column triples used to compute N, we do not know ahead of time how many columns of N each of these triples will produce. We, therefore, also set a maximum value on the number of columns of N needed, and we stop generating column triples when the size is reached, even if we have not yet checked l triples.

Fourth, it is always possible that the column triples that we have generated do not sufficiently constrain L to allow us to accurately determine it, because Equation 2 is only a subset relationship. We can also check this possibility. Recall that L is computed by taking the three least significant components of N, based on its three smallest singular values. If the fourth smallest singular value of N is also very small, we know that our computation of L is unreliable. In this case, we simply report that the algorithm failed to find an answer, although we might also try the computation again, hoping that a larger value for l or a different random selection of column triples would produce more information.

Fifth, it is possible that N does not directly contain enough information to allow us to determine every column and row of $\hat{Q}$. For example, a row of N will consist of all zeros when every triple of columns selected had at least one missing element in that row. In this case, we have now gathered information about that row's value in the nullspace we are computing. Also, it is possible that L does not allow us to estimate $Q_i$, as we have indicated, because $(L^p)$ does not have full rank, and we cannot take its pseudoinverse. In either of these situations, we simply estimate the maximum subrectangle of Q for which we have data, and then extend this subrectangle to a least-squares estimate of the full rectangle.

Figure 8:
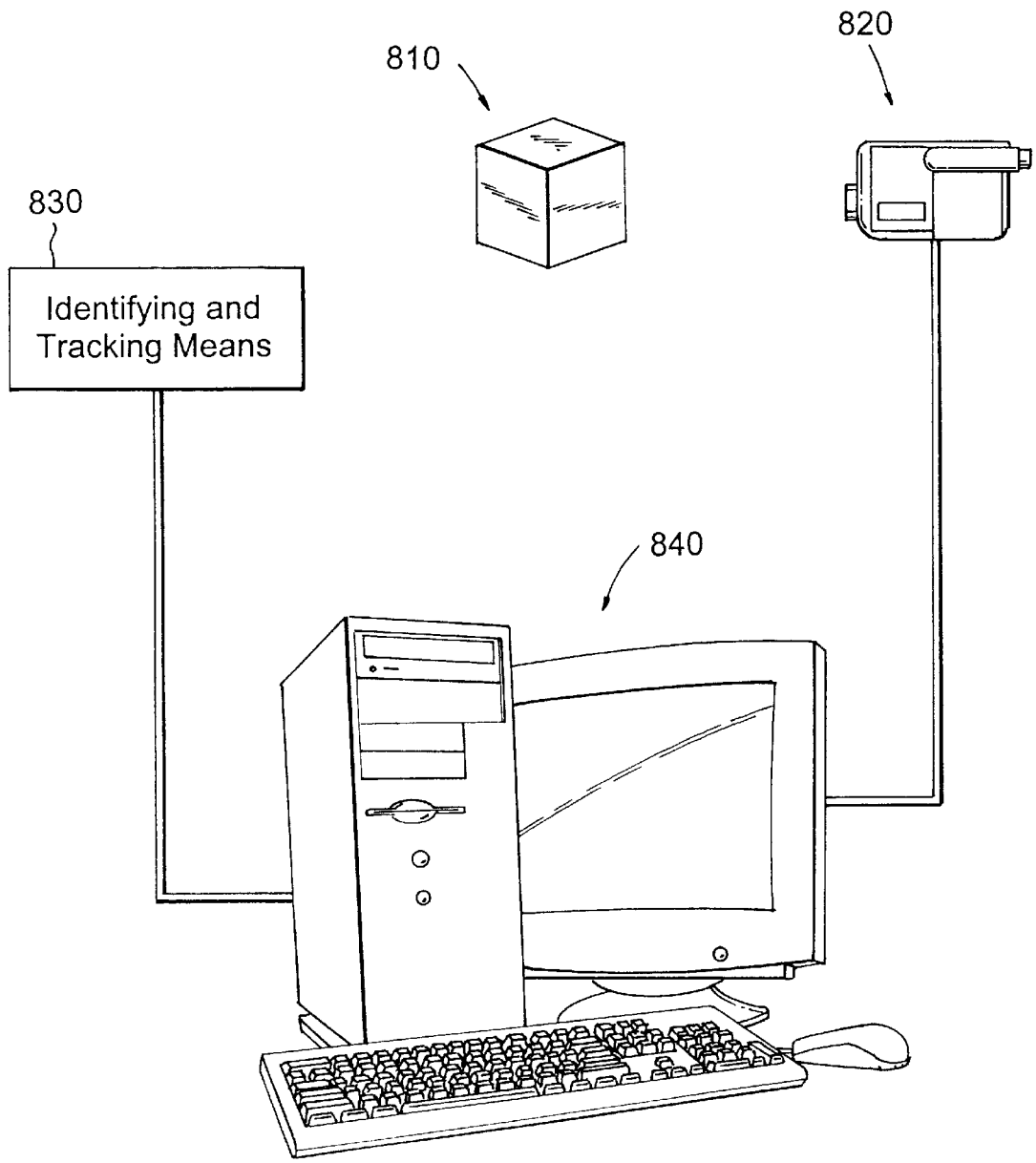
FIG. 8 depicts an apparatus for practicing the method of the present invention.

Referring now to FIG. 8, there is illustrated an apparatus of the present invention referred to generally by reference numeral 800. FIG. 8 illustrates an apparatus 800 for generating a complete scene structure from a video sequence that provides incomplete data, wherein the apparatus comprises a camera 820 for acquiring a sequence of images of a fixed scene 810. Also provided is a means for identifying and tracking point features through the sequence 830. Preferably, the identifying and tracking means 830 is an algorithm known in the art such as those described by C. Tomasi and T. Kanade, "Detection and Tracking of Point Features," Carnegie-Mellon Tech. Report CMU-CS-91-132, 1991; and I. Cox and S. Hingorani, "An Efficient Implementation of Reid's Multiple Hypothesis Tracking Algorithm and its Evaluation for the Purposes of Visual Tracking," IEEE Trans on PAMI, vol. 18, no. 2, pp. 138–150, Feb. 1996.

Also provided in apparatus 800 is a computing means for building a first matrix consisting of point locations from a motion sequence; building the first matrix with some missing elements using the coordinates of the features where some features are not present in some images; building an approximate solution comprising; selecting triples of columns from the first matrix; forming their nullspaces into a second matrix; taking the three smallest components of the second matrix; applying an iterative algorithm to the three smallest components to build a third matrix and to improve the estimate; and decomposing the third matrix to determine the complete scene structure. The computing means is preferably a personal computer.

Figure 9:
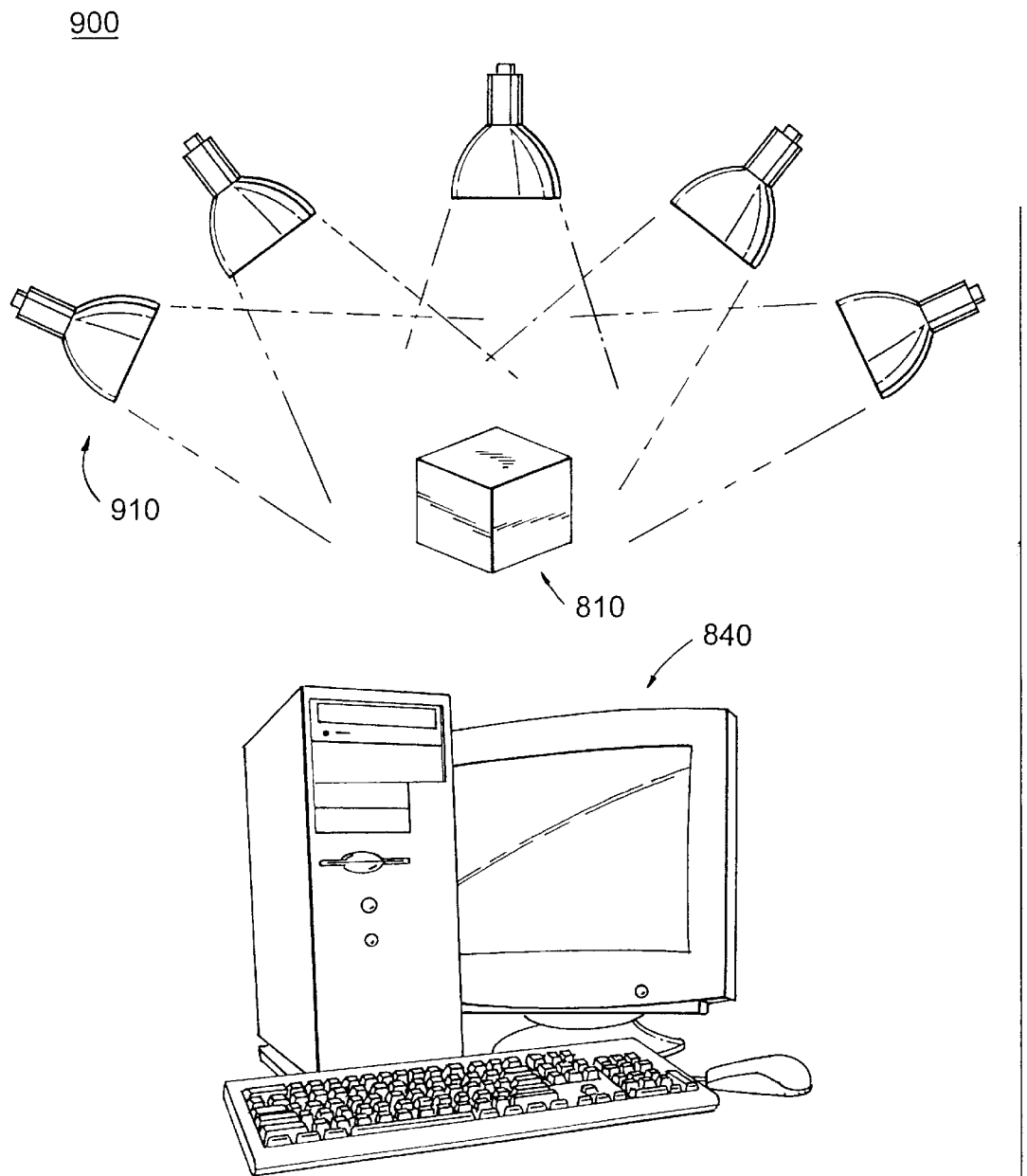
FIG. 9 depicts an alternative apparatus for practicing an alternative method of the present invention.

Referring now to FIG. 9, there is illustrated an alternative apparatus of the present invention referred to generally by reference numeral 900. FIG. 9 illustrates an apparatus 900 for generating a complete scene structure from a video sequence that provides incomplete data. The apparatus comprises a plurality of discrete point light sources 910 for acquiring a series of images of a fixed scene 810.

The apparatus 900 also comprises a computing means 840 for building a first matrix consisting of intensity values from multiple images; identifying points in each image that provide unreliable data due to shadowing or specularities; building the first matrix of intensity values with missing elements where data is unreliable; building an approximate solution comprising; selecting triples of columns from the first matrix; forming their nullspaces into a second matrix; taking the three smallest components of the second matrix; applying an iterative algorithm to the three smallest components to build a third matrix and to improve the estimate; and decomposing the third matrix to determine the complete scene structure. The computing means is preferably a personal computer.

EXAMPLES

In this section, we describe experiments to test the accuracy of our method. Our method and previous ones consider the same problem formulation of minimizing the sum of square differences between the elements present in a data matrix and the corresponding elements of a new, rank three matrix. For this reason, we evaluate methods based on how well they succeed in finding a rank three matrix to minimize this error measure. It should be noted that this error measure is optimal when independent Gaussian noise corrupts the data and we have no prior information about the values of missing elements.

We experiment with seven different methods, labeled as follows: (NEW) We use our method by itself and (NEW-IT) as the starting point for an iterative solution. We compare this to an iterative solution with a random starting point. To determine the importance of having a good starting point, we take the best solution found when the iterative method is run with (RAN1) one (RAN3) three or (RAN5) five different random starts. We compare these results to (GT) an estimate of ground truth and (GT-IT) an estimate of the globally optimal solution (the one with smallest error) found by using the solution in (GT) as a starting point for the iterative method. When using simulated data, we have ground truth available. For a real motion sequence, we use a solution based on all the data for (GT).

A number of specific thresholds must be set in these experiments. We run the iterative method either for 100 iterations, or until it converges with ten decimal places of accuracy. In our algorithm, we select triples of columns until their nullspace (N) occupies ten times as many columns or rows as the original matrix (with a maximum limit of 1000 column triples, which, in practice, we hardly ever reach). In computing the nullspace to each triple of columns, we take to be zero any singular values less than 0.1. We compute L by taking the three least significant components of the SVD of N; if the fourth smallest singular value is less than 0.001, we determine that the result is unreliable, since there is not a well-defined, 3-D nullspace to the matrix.

We generate synthetic data in two settings. First, we generate points in a synthetic motion sequence. In each sequence, we select twenty points randomly inside a cube. We then generate twenty frames at uniform intervals as we rotate the object ninety degrees about the z-axis (in-plane rotation), and ninety degrees about a randomly chosen axis in the plane. This provides a simple example of the type of sequence in which structure from motion algorithms are commonly applied. We then assume that each point is occluded for some fraction of the sequence. This fraction is randomly chosen for each point from a uniform distribution. We vary the expected value of the occlusion length to vary the number of missing elements in our experiments. The occluded frames for each point are randomly assigned to either the beginning of the sequence, the end of the sequence, or are split between the beginning and end. Each of these three conditions occurs with equal probability. We then add Gaussian noise with a standard deviation of 0.25% of the maximum range of the elements. For a 500×500 pixel image, this would be comparable to a standard deviation of 1.25 pixels.

Next, we generate random intensity images. First, we generate a scene containing 100 points, in which every scene point's surface normal is chosen with a uniform distribution on the unit half-sphere with positive z components. We select the albedo of each point from a uniform distribution from 0 to 1. We then select light sources, of unit intensity, and a to direction that is drawn from the same distribution as the scene surface normals. Each light source combines with the scene to generate an intensity image, with intensities ranging from minus one to one. Gaussian noise was then added, with a standard deviation of 0.01. Finally, intensities less than zero were considered to be missing values.

Finally, we have run our algorithm on data obtained from a real motion sequence described in H. Sawhney et al. (1990) "Description and Reconstruction from Image Trajectories and Rotational Motion" *Int. Conf. on Comp. Vis.:* 494–498. This sequence contained forty points tracked across eight images. One of the frames is shown in FIG. 1. In this sequence, we generated artificial occlusions exactly as described for the random motion sequences. We then compensated for the effects of translation by measuring the translation of the center of mass of those points present in adjacent frames, and removing this translation. This matrix was then scaled to make it of the same order of magnitude as in the synthetic motion sequences so that all the same parameters could be appropriately used. This gave all methods the same matrix to work with, which contained sensing errors and errors due to inaccuracies in determining translation.

In FIGS. 2, 3, 4, 5, 6 and 7, we graph the results. The first point to notice is that best results are produced when our method is used as a starting point for an iterative solution. In motion experiments, this produces much better results than the iterative solution repeated one, three or five times with random starting points. In particular, as the problem becomes more difficult, with 40% or 50% of the data occluded, the performance of our method declines much more slowly than that of the iterative solution using multiple random starting points. In fitting linear surfaces to intensity images, our Is method produces essentially perfect results, even though this problem seems to be quite difficult when a random starting point is used.

Second, we can see that our basic method, without iterative refinement, can produce good results in some cases. For motion, when 20% to 30% of the points are occluded, our method produces solutions with error that is about twice as large as the error in ground truth. For the intensity experiment, our method produces solutions with only about 30% more average error than ground truth. These figures indicate that our method can produce a good, approximate solution, without iterative refinement. Note, however, that when the amount of occlusion in motion increases, the quality of our solution can decline significantly.

Third, we can see that when there are significant amounts of data missing, the motion problem can be quite difficult. Even our new method only finds the best solution a little more than 90% of the time when half the data are missing. The difficulty of a motion problem will certainly depend not just on the number of missing data, but also on the particular patterns of occlusion and on the magnitudes of motion and the number of frames. However, we feel that our experiments are based on reasonable scenarios, and that even more difficult motion situations, with less motion and more occlusion, are of interest. Therefore, our simulations, though preliminary, indicate that real problems of interest may present a difficult challenge for any existing algorithm, if an optimal solution is desired with very high probability.

Linear fitting of data matrices with missing elements is a central problem for several recent algorithms. We present a novel method of solving this problem, which is particularly useful as a starting point for an iterative solution. Moreover, our experiments indicate that, in some realistic settings, this problem is not easy; that an iterative solution will frequently produce inaccurate results without a good starting point.

While there have been shown and described what are considered to be preferred embodiments of the invention and examples, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

I claim:

1. A method for generating a complete scene structure from a video sequence that provides incomplete data, the method comprising the steps of:

(a) building a first matrix consisting of point locations from the video sequence by:
      (i) acquiring a sequence of images of a fixed scene using a moving camera;
      (ii) identifying and tracking point features through the sequence; and
      (iii) using the coordinates of the features to build the first matrix with some missing elements where some features are not present in some images;

(b) building an approximate solution by:
      (i) selecting triples of columns from the first matrix;
      (ii) forming their nullspaces into a second matrix; and
      (iii) taking the three smallest components of the second matrix;

(c) applying an iterative algorithm to the three smallest components to build a third matrix and to improve the estimate; and (d) decomposing the third matrix to determine the complete scene structure.

2. The method of claim 1, wherein the first matrix is given by the formula:

$$\hat{Q} \equiv \begin{pmatrix} \hat{X}_{1,1} & \hat{X}_{1,2} & \ldots & \hat{X}_{1,n} \\ \hat{Y}_{1,1} & \hat{Y}_{1,2} & \ldots & \hat{Y}_{1,n} \\ \hat{X}_{2,1} & \hat{X}_{2,2} & \ldots & \hat{X}_{2,n} \\ \hat{Y}_{2,1} & \hat{Y}_{2,2} & \ldots & \hat{Y}_{2,n} \\ \vdots & \vdots & \vdots & \vdots \\ \hat{X}_{m/2,1} & \hat{X}_{m/2,2} & \ldots & \hat{X}_{m/2,n} \\ \hat{Y}_{m/2,1} & \hat{Y}_{m/2,2} & \ldots & \hat{Y}_{m/2,n} \end{pmatrix}$$

where $\hat{Q}$ is a single matrix containing all the tracked image points, each column of which contains all the image coordinates of a single point, and where $\hat{X}_{i,j}$ is the X coordinate of the j'th noisy image point in the i'th image and $\hat{Y}_{i,j}$ is the Y coordinate of the j'th noisy image point in the i'th image.

3. The method of claim 1, wherein the triples of columns are selected at random.

4. The method of claim 1, wherein the second matrix is given by the formula:

$$N = [N_1 N_2 \ldots N_1]$$

where $S_i$ denotes the linear space spanned by the i'th triple of columns, $N_i$ denote the nullspace of $S_i$, such that each column of $N_i$ represents a vector orthogonal to the space $S_i$.

5. The method of claim 1, wherein the iterative algorithm is given by the formula:

$$T_{i+1} = \hat{Q} P_i^+$$

where $T_i$ is an estimate at iteration i of the matrix T, that represents the camera motion, $P_i$ is an estimate at iteration i, of the matrix that represents the scene structure, $P_i^+$ is the pseudoinverse of $P_i$, and $\hat{Q}$ is a single matrix containing all the tracked image points, each column of which contains all the image coordinates of a single point, and where $\hat{X}_{i,j}$ is the X coordinate of the j'th noisy image point in the i'th image and $\hat{Y}_{i,j}$ is the Y coordinate of the j'th noisy image point in the i'th image, such that a series of estimates of $\hat{Q}$, T, and P are produced in which the magnitude of $\hat{Q}-Q$ is non-increasing, where Q represents the complete scene structure.

6. The method of claim 1, wherein the step of building an approximate solution comprises the substeps of:
 (a) computing the nullspace of a fully occupied subrectangle of the columns to generate the nullspace of column triples, where the nullspace is disregarded if the subrectangle is substantially degenerate;
 (b) choosing column triples until their nullspaces are larger than the first matrix by a predetermined constant factor, where all results are judged unreliable if the second matrix has a fourth smallest singular value that is smaller than a predetermined threshold; and
 (c) heuristically extending the second matrix through a repeated least squares process if an accurate estimate for a subset of the data is provided.

7. A method for generating a complete scene structure from a video sequence that provides incomplete data, the method comprising the steps of:
 (a) building a first matrix consisting of intensity values from multiple images by:
  (i) acquiring a series of images of a fixed scene with separate, point light sources;
  (ii) identifying points in each image that provide unreliable data due to shadowing or specularities; and
  (iii) building the first matrix of intensity values with missing elements where data is unreliable;
 (b) building an approximate solution by:
  (i) selecting triples of columns from the first matrix;
  (ii) forming their nullspaces into a second matrix; and
  (iii) taking the three smallest components of the second matrix;
 (c) applying an iterative algorithm to the three smallest components to build a third matrix and to improve the estimate; and
 (d) decomposing the third matrix to determine the complete scene structure.

8. The method of claim 7, wherein the first matrix is given by the formula:

$$\hat{Q} = HN + E$$

where, $\hat{Q}$ is a data matrix in which the j'th column gives the intensity of the j'th pixel in every image, E is a matrix of sensing errors, H is a lighting matrix in which the i'th row is the h vector for the i'th image, h is a 3-D vector for the point light source scaled by its intensity, and N is a scene matrix in which the j'th column is $p_j n_j$ where $p_j$ is the surface albedo and $n_j$ the surface normal of the 3-D planar patch.

9. The method of claim 7, wherein the triples of columns are selected at random.

10. The method of claim 7, wherein the second matrix is given by the formula:

$$N = [N_1 N_2 \ldots N_1]$$

where $S_i$ denotes the linear space spanned by the i'th triple of columns, $N_i$ denote the nullspace of $S_i$, such that each column of $N_i$ represents a vector orthogonal to the space $S_i$.

11. The method of claim 7, wherein the iterative algorithm is given by the formula:

$$T_{i+1} = \hat{Q} P_i^+$$

where $T_i$ is an estimate at iteration i, of the matrix that represents the lighting, $P_i$ is an estimate at iteration i, of the matrix that represents the surface normals at scene points, $P_i^+$ is the pseudoinverse of $P_i$, and $\hat{Q}$ is a single matrix containing all the tracked image points, each column of which contains all the image coordinates of a single point, and where $\hat{X}_{i,j}$ is the X coordinate of the j'th noisy image point in the i'th image and $\hat{Y}_{i,j}$ is the Y coordinate of the j'th noisy image point in the i'th image, such that a series of estimates of $\hat{Q}$, T and P are produced in which the magnitude of $\hat{Q}-Q$ is non-increasing, where Q represents the complete scene structure.

12. The method of claim 7, wherein the step of building an approximate solution comprises the substeps of:
 (a) computing the nullspace of a fully occupied subrectangle of the columns to generate the nullspace of column triples, where the nullspace is disregarded if the subrectangle is substantially degenerate;
 (b) choosing column triples until their nullspaces are larger than the first matrix by a predetermined constant factor, where all results are judged unreliable if the second matrix has a fourth smallest singular value that is smaller than a predetermined threshold; and
 (c) heuristically extending the second matrix through a repeated least squares process if an accurate estimate for a subset of the data is provided.

13. An apparatus for generating a complete scene structure from a video sequence that provides incomplete data, the apparatus comprising:

a camera for acquiring a sequence of images of a fixed scene;

means for identifying and tracking point features through the sequence; and computing means for building a first matrix consisting of point locations from a motion sequence; building the first matrix with some missing elements using the coordinates of the features where some features are not present in some images; building an approximate solution comprising: selecting triples of columns from the first matrix; forming their nullspaces into a second matrix; taking the three smallest components of the second matrix; applying an iterative algorithm to the three smallest components to build a third matrix and to improve the estimate; and decomposing the third matrix to determine the complete scene structure.

14. The apparatus of claim 13, wherein computing means is a personal computer.

15. An apparatus for generating a complete scene structure from a video sequence that provides incomplete data, the apparatus comprising:

a plurality of discrete point light sources for acquiring a series of images of a fixed scene; and computing means for building a first matrix consisting of intensity values from multiple images; identifying points in each image that provide unreliable data due to shadowing or specularities; building the first matrix of intensity values with missing elements where data is unreliable; building an approximate solution comprising: selecting triples of columns from the first matrix; forming their nullspaces into a second matrix; taking the three smallest components of the second matrix; applying an iterative algorithm to the three smallest components to build a third matrix and to improve the estimate; and decomposing the third matrix to determine the complete scene structure.

16. The apparatus of claim 15, wherein the computing means is a personal computer.

* * * * *